(12) United States Patent
Mildner et al.

(10) Patent No.: US 9,193,391 B2
(45) Date of Patent: Nov. 24, 2015

(54) MOTOR VEHICLE BODY WITH REINFORCED SHOCK ABSORBER CONNECTION

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 14/522,408

(22) Filed: Oct. 23, 2014

(65) Prior Publication Data
US 2015/0108791 A1 Apr. 23, 2015

(30) Foreign Application Priority Data
Oct. 23, 2013 (DE) .................. 10 2013 017 730

(51) Int. Cl.
*B62D 25/16* (2006.01)
*B62D 25/08* (2006.01)

(52) U.S. Cl.
CPC .............. *B62D 25/16* (2013.01); *B62D 25/088* (2013.01)

(58) Field of Classification Search
CPC .... B60R 13/0861; B62D 21/11; B62D 25/08; B62D 25/088; B62D 25/16; B62J 15/00
USPC ........... 296/30, 198, 203.01, 203.03, 203.04; 280/124.1, 124.128, 124.145, 124.147, 280/124.154, 124.155
See application file for complete search history.

(56) References Cited

U.S. PATENT DOCUMENTS

| 2004/0232647 A1* | 11/2004 | Kim | 280/124.155 |
| 2010/0078970 A1* | 4/2010 | Kim | 296/198 |
| 2013/0082482 A1* | 4/2013 | Kim | 296/198 |

FOREIGN PATENT DOCUMENTS

| DE | 102004027377 A1 | 12/2005 |
| DE | 102004049977 A1 | 4/2006 |
| DE | 102008047995 A1 | 4/2009 |
| JP | 2006044427 A | 2/2006 |

* cited by examiner

*Primary Examiner* — Jason S Daniels
(74) *Attorney, Agent, or Firm* — Ingrassia Fisher & Lorenz PC (57) ABSTRACT

A motor vehicle body is disclosed which includes at least one rear wheel house and a reinforcing structure for connecting a shock absorber in the region of the wheel house. The reinforcing structure includes a reinforcing profile arranged on an outside of the wheel house facing a rear wheel, and extends with a spring plate connecting piece provided for fastening a spring plate from a lower side of the wheel house to an upper apex portion of the wheel house. The reinforcing profile located in the region of the upper apex portion of the wheel house includes a middle profile portion with a shock absorber connection, to which a shock absorber can be fastened with an end portion facing away from the rear wheel.

14 Claims, 7 Drawing Sheets

MOTOR VEHICLE BODY WITH REINFORCED SHOCK ABSORBER CONNECTION

CROSS REFERENCE TO RELATED APPLICATION

This application claims priority to German Patent Application No. 102013017730.8 filed Oct. 23, 2013, which is incorporated herein by reference in its entirety.

TECHNICAL FIELD

The present disclosure relates to a motor vehicle body with a rear wheel house and with a reinforcing profile for the shock absorber connection to the motor vehicle body arranged thereon.

BACKGROUND

For the rear wheel or rear axle suspension of a motor vehicle, in addition to a spring, shock absorbers are typically also provided. The end of the shock absorber facing away from the axle is to be connected to the body. Since in the region of a shock absorber connection on the body side comparatively high mechanical loads occur during the operation of the vehicle, such connecting regions of the motor vehicle body have to be structurally reinforced. It has been usual up to now to arrange additional reinforcing profiles in the region of a wheel house in order to be able to furnish the shock absorber with locally adequate stability in the connecting region.

Accordingly, as disclosed in DE 10 2004 027 377 A1 a wheel house support profile is known on which a reinforcing profile in extension of a longitudinal axis of a shock absorber is additionally fastened to the outer surface of a wall and of the wheel house support profile. The respective reinforcing profile in this case is fastened to a corresponding inner wall of the lateral frame of the body via a U-shaped flange.

Although with such reinforcing profiles the region of a shock absorber connection of the motor vehicle body can be locally reinforced, it is desirable, however, that such reinforcing profiles additionally assume or reinforce further additional functions of the body.

Accordingly, there is a need to provide an improved shock absorber connection or shock absorber connection reinforcement which at the same time also contributes to a reinforcement or stiffening of the motor vehicle body proper. Here, the shock absorber connection should result in a component reduction and contribute to a reduction of the motor vehicle gross weight. Furthermore, implementation should be as cost-effective and production-rational as possible.

SUMMARY

A motor vehicle body is disclosed which includes at least one rear wheel house and a reinforcing structure for connecting a shock absorber in the region of the wheel house. Here, the reinforcing structure includes at least one reinforcing profile arranged on an outside of the wheel house facing a rear wheel. Accordingly, the reinforcing profile extends with a spring plate connecting piece provided for fastening a spring plate from a lower side of the wheel house as far as to an upper apex portion of the wheel house. Located in the region of the upper apex portion of the wheel house, the reinforcing profile includes a middle profile portion with a shock absorber connection, to which a shock absorber can be fastened with an end portion facing away from the rear wheel.

In that the reinforcing profile extends from a spring plate fastening or from a spring plate that is arranged on a wheel house or fastened thereon as far as to an apex portion of the wheel house located at the top. One and the same reinforcing profile can structurally reinforce the spring connection of the rear axle, as well as the shock absorber connection of the rear axle or of the rear wheel to the motor vehicle body. Thus, both, namely the regions of the motor vehicle body which are provided for the shock absorber connection and also for the spring connection and come to lie spaced from one another can be structurally reinforced for the rear wheel and rear axle connection respectively with one and the same reinforcing profile.

Through this integration, the number of the body parts can be reduced so that ultimately the production effort as well as production and manufacturing costs of the motor vehicle can also be reduced. In that the reinforcing structure extends from a spring plate as far as to a connecting portion for the shock absorber the wheel house, consequently the entire body, can be subjected to a complementary structural reinforcement and stiffening in that region. In this regard, the reinforcing profile can contribute to increasing the torsional stiffness of the body as a whole.

According to a further configuration, the reinforcing profile has a C- or U-profile shaped cross section at least in regions. It is furthermore connected to the outside of the wheel house with at least one lateral flange projecting to the outside. The flange projecting to the outside of the C- or U-shaped reinforcing profile cross section can be embodied in particular as a circumferential flange, which almost completely contacts the outside of the wheel house and over its entire extension is connected to the wheel house in a fixed manner either over the full area or point-like. The reinforcing profile can thus form a hollow profile structure with the wheel house, which can give the wheel house and the reinforcing structure formed by wheel house and reinforcing profile a particularly high intrinsic stiffness.

According to a further configuration, the reinforcing profile extends from the upper apex portion of the wheel house in vehicle longitudinal direction towards the back. The reinforcing profile is structurally connected to a rear end reinforcing structure with a rear profile section, i.e. a profile section facing away from the travelling direction. The rear end reinforcing structure can be designed as a supporting component of the motor vehicle body. By way of the direct connection of the reinforcing profile to the rear end reinforcing structure, the body portions provided for the shock absorber connection and also for the spring connection and are furnished by the reinforcing profile can be connected to further structural components, in particular to structural nodes of the motor vehicle body in a structural, i.e. load-transmitting manner.

By way of the direct connection of the reinforcing profile to a rear end reinforcing structure, the forces which via the spring suspension and via the shock absorber are introduced into the body, namely into the reinforcing profile of the body, can be particularly favorably discharged into bordering supporting structural components such as into the rear end reinforcing structure of the motor vehicle body. Furthermore, the stability as well as the intrinsic stiffness of the motor vehicle body and the acoustic resonance characteristic of the motor vehicle body can be specifically improved because of this.

According to a further configuration, the rear end reinforcing structure includes a profile ring enclosing a rear aperture of the motor vehicle. The rear end reinforcing structure may form or include a profile ring bordering on the rear aperture. The profile ring may be designed as a circumferential hollow profile. Such a profile ring is typically formed of multiple profiled metal sheets, which are each formed L or Z-shaped and are arranged complementarily to one another for forming a closed hollow profile overlapping one another at least in regions.

A profile ring enclosing the rear aperture, which can generally also be described as portion ring of a rear wall structure of the motor vehicle body, can be formed at least partially and in the lateral wall region by a C- or D-pillar at least in regions and depending on concrete motor vehicle configuration. Such a rear end reinforcing structure is to be provided on the motor vehicle body anyhow. Through the structural and direct connection of the rear end reinforcing structure to the reinforcing profile for the shock absorber and spring connection extending along the wheel house, the stability and torsional stiffness of the motor vehicle can be further increased.

According to a further configuration, the rear profile section of the reinforcing profile projecting towards the back from the apex portion of the wheel house against the travelling direction includes a flange projecting in vehicle transverse direction (y) to the inside, which is connected to a back side of the rear end reinforcing structure facing away from the travelling direction. In this regard, the rear profile portion of the reinforcing profile, based on the vehicle longitudinal direction (x) closes off with the rear end reinforcing structure, in particular with the profile ring enclosing the rear aperture. The flange of the profile portion projecting to the inside in vehicle transverse direction can accordingly act as a type of closing plate for the rear end of the profile portion. Because of this, the connection of the wheel house to the rear end reinforcing structure can be additionally improved and reinforced.

According to a further configuration, the reinforcing profile, in a plane (x, z) formed by vehicle longitudinal direction (x) and vehicle vertical direction (z) as a profile end C- or U-shaped or angled L-shaped which at least partially follows the contour of the wheel house. In the case of a C- or U-shaped course of the reinforcing profile, the reinforcing profile similar to the wheel house as well, is configured open towards the bottom.

Accordingly, this typically includes a front profile portion located in travelling direction at the front and extending from the lower edge of the wheel house to the apex portion of the wheel house, bordering thereon the middle profile portion approximately extending over the apex portion of the wheel house and bordering thereon, a rear profile portion facing away from the travelling direction, which can extend from the middle portion located higher up, downwards towards the lower edge of the wheel house. In this configuration, the reinforcing profile approximately follows the outer contour of the wheel house.

In another configuration, in which the reinforcing profile follows an L-shaped angled course, the rear profile portion can be located in a horizontal extension of the middle profile portion and extend approximately parallel to a side member of the rear end floor structure of the motor vehicle body substantially extending in vehicle longitudinal direction (x) and horizontally. Such a contour profile of the reinforcing profile not only contributes to an improved structural connection and force transmission of chassis and motor vehicle body, but also structurally reinforce and stiffen the motor vehicle body, in particular in the region of its wheel house.

According to a further configuration, the reinforcing profile, with respect to the travelling direction of the motor vehicle located at the front, includes a front profile portion which substantially extends in vehicle vertical direction from the spring plate as far as to the apex portion of the wheel house. That front profile portion typically extends along the outside of the wheel house facing towards the outside, in vehicle transverse direction (y). That profile portion in this regard is distant in vehicle longitudinal direction from a front edge or from a front envelope curve of the wheel house. By way of the configuration of the reinforcing profile which substantially extends in vehicle vertical direction, the forces introduced into the motor vehicle body or into the reinforcing profile via the spring suspension can be directly discharged or passed on in vehicle vertical direction to the apex point of the wheel house and further to the connection of a shock absorber on the body side.

According to a further configuration, the middle profile portion of the reinforcing profile which comes to lie in the region of the apex portion of the wheel house substantially extends in vehicle longitudinal direction. That middle profile portion serves in particular for the shock absorber connection. The middle profile portion typically also comes to lie with its edge-sided connecting flanges on the outside of the wheel house which is oriented in vehicle transverse direction (y) and along the vehicle vertical axis (z).

Middle and front profile portion of the reinforcing profile typically merge unitarily into one another. Between the front profile portion and the middle profile portion, the reinforcing profile accordingly has an almost right-angled curvature portion via which the forces introduced in the front profile portion via the spring plate can be discharged and diverted into the middle profile portion bordering against the travelling direction towards the back.

According to a further configuration, the shock absorber connection is formed on the middle profile portion projecting in vehicle transverse direction to the outside. At this point, the reinforcing profile has in particular a bulge or a profile elevation or profile expansion in order to be able to furnish as large as possible a support or connecting area for the shock absorber. The concrete geometric configuration of the middle profile portion and of its shock absorber connection projecting towards the outside in vehicle transverse direction or projecting from directly bordering profile portions can vary depending on the position and configuration of the respective shock absorber.

According to further configuration, the reinforcing profile based on the travelling direction of the motor vehicle located at the back, i.e. facing away from the front profile portion, includes a rear profile portion. This profile portion substantially extends in vehicle vertical direction (z) from the apex portion of the wheel house to a rear lower edge of the wheel house. The rear profile portion extends in particular arc-like, following the outer contour of the wheel house. Through the arc-like shaping the forces and shocks introduced into the reinforcing profile can be comparatively harmonically discharged into bordering body components.

Any point loads or mechanical peak loads can be dampened or weakened in this way. This can have an advantageous effect on the overall stability and structural stiffness of the motor vehicle body so that body components concerned can be implemented with even thinner walls, or with reduced sheet metal thicknesses and therefore in a weight, material and ultimately cost-saving manner.

As a further development hereof, the rear profile portion of the reinforcing profile includes on its lower end a curved section projecting in vehicle transverse direction (y) to the outside. This curved section supports itself in vehicle longitudinal direction on the outside of the wheel house. The curved section includes in particular an arc which runs in the plane formed by vehicle vertical direction (z) and vehicle transverse direction (y) by means of which the structural connection of the rear end of the reinforcing profile to the rear end reinforcing structure, can be moved based on the vehicle transverse direction (y) towards the outside. That move and contour running towards the outside can prove advantageous in particular for connection to a rear end reinforcing or rear wall structure.

According to a further configuration in this regard, the rear end reinforcing structure includes at least one reinforcing plate which extends in vehicle longitudinal direction (x) along an inside of the wheel house facing away from the rear profile portion of the reinforcing profile. The at least one reinforcing plate accordingly supports itself in vehicle transverse direction (y) on an outside of a rear end side member. Here it is provided in particular that the reinforcing plate assigned to the rear end reinforcing structure is arranged at least in regions overlapping with the rear profile portion of the reinforcing profile or with its curved section in order to make possible mutual structural connection or force discharge in particular from the reinforcing profile into the rear end reinforcing structure.

According to a further configuration, two reinforcing plates which in vehicle vertical direction (z) are spaced from one another are provided for the rear end reinforcing structure which extend in vehicle longitudinal direction (x) between a rear end rear wall plate and the wheel house, and which in vehicle transverse direction (y) extend between the rear end side member and a side wall located outside. The two reinforcing plates in a manner of speaking form a structure-reinforcing box which in vehicle vertical direction (z) of the surface of the reinforcing plate, which in vehicle longitudinal direction is delimited by the wheel house and by the rear wall plate and in vehicle transverse direction on the inside by the side member and on the outside by the body side wall. At least one and preferably both reinforcing plates in this way can form a structural node of the motor vehicle body via which the mechanical forces discharged or introduced into the at least one reinforcing plate via the reinforcing profile can be distributed and accordingly discharged into the bordering body components.

According to a further configuration, at least one flange of the reinforcing profile contacting the outside of the wheel house is arranged in vehicle vertical direction (z) and in vehicle transverse direction (y) at least overlapping in regions or overlapping with a flange of the at least one reinforcing plate. Between the flanges of the reinforcing profile and of the reinforcing plate the wheel house typically extends. In this regard, not only a doubling of material but a triple material or sheet metal layer can be provided here.

Through the arrangement of flange portions of the reinforcing profile covering or overlapping at least in regions on the one hand and of the reinforcing plate on the other hand, the forces absorbed via the reinforcing profile by the chassis, in particular via the spring plate and the shock absorber can be discharged into the reinforcing plate of the reinforcing structure to a high degree.

Generally, for connecting the previously mentioned body components, joining methods such as for example laser welding, spot welding, riveting, gluing or penetration joining are possible in order to form in each case a preferably long-life, durable and permanent connection between the body components.

In a further aspect, a motor vehicle is finally provided which includes a motor vehicle body described before.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
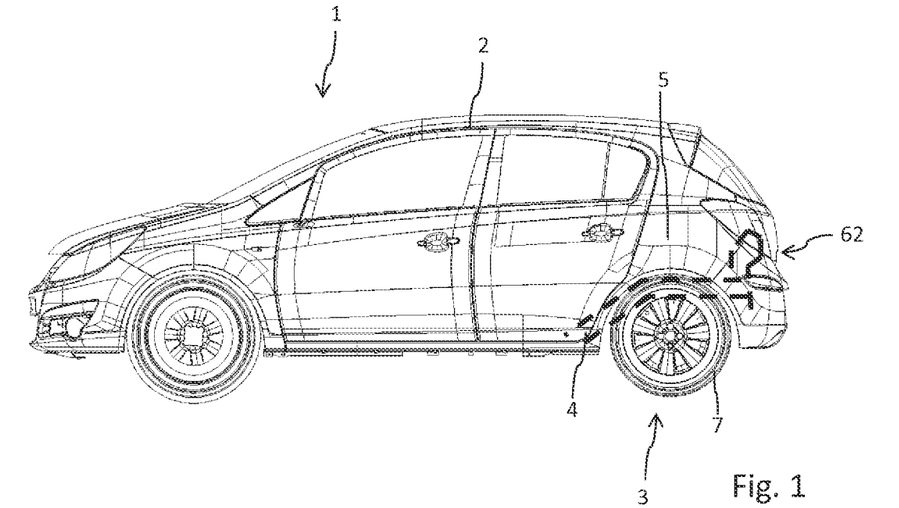
FIG. 1 is a motor vehicle configured as a passenger car in lateral view.
Figure 4:
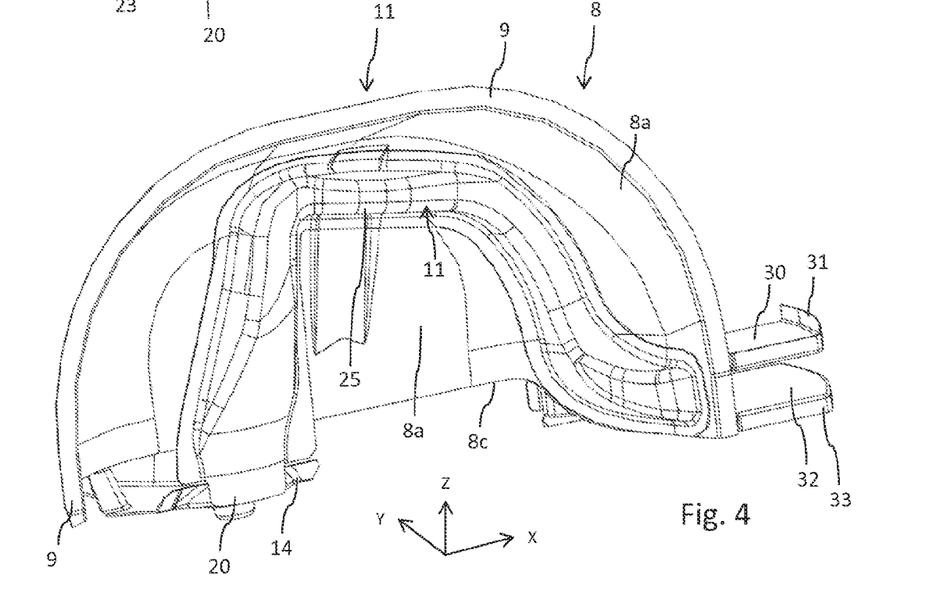
FIG. 4 is a perspective view corresponding to FIG. 3 of a reinforcing profile arranged on the wheel house.
Figure 5:
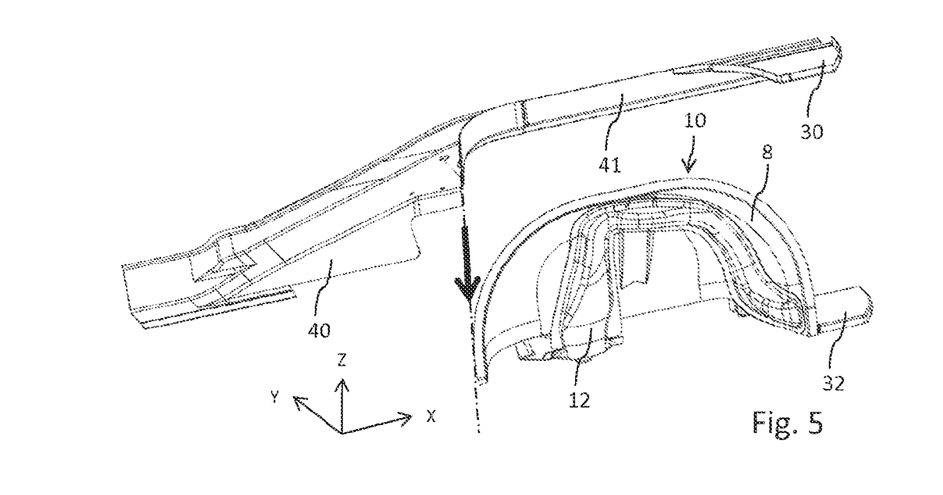
FIG. 5 is the assembly according to FIG. 4 with a lower shell of a side member.

The motor vehicle 1 which is schematically shown in lateral view in FIG. 1 includes a self-supporting motor vehicle body 2. Indicated in FIG. 1 furthermore is the side member 4 which in the region of a rear axle 3 runs obliquely upwards in regions, following this, runs against the travelling direction of the motor vehicle 13, however largely horizontally towards the back, the rear end of which is connected to a rear end reinforcing structure 62. The motor vehicle body 2 includes in the region of a suspension 4 a rear wheel 7, a wheel house 8 which follows the wheel envelope curve and is correspondingly curved, which, as shown in FIG. 4, towards the outside, in vehicle transverse direction (y), includes a circumferential flange 9 for connection of a side wall 5.

Figure 2:
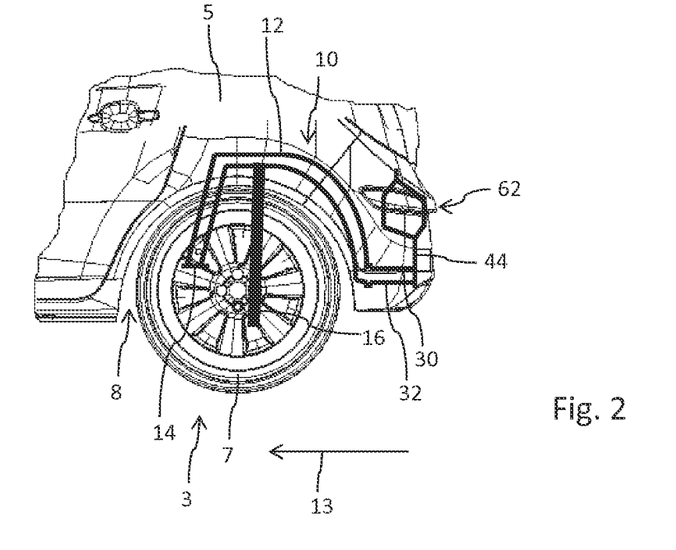
FIG. 2 is a schematic enlarged representation of the rear wheel region of the motor vehicle according to FIG. 1.
Figure 7:
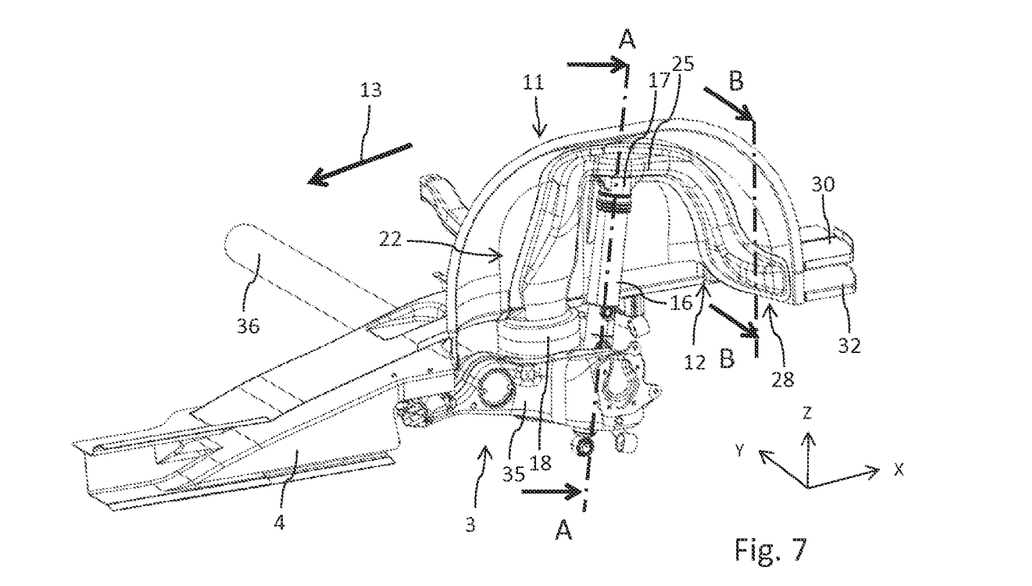
FIG. 7 is a perspective representation of a rear wheel suspension provided with the reinforcing profile.

FIG. 2, compared with FIG. 7, shows a simplified schematic representation of a wheel suspension with a shock absorber 16 and with a spring plate 14. Shown furthermore is the course of a reinforcing profile 12 of the reinforcing structure 10 in the region of the wheel house 8. The reinforcing structure 10 which in this regard is formed by the wheel house 8 and the reinforcing profile 12 is shown isolated and perspectively in FIG. 4. The reinforcing profile 12 includes a substantially C- or U-shaped cross-sectional profile with a circumferential flange 21, 23. The reinforcing profile 12 in the plane (x, z) formed by vehicle longitudinal direction (x) and vehicle vertical direction (z) has a C- or U-shaped curved or arched contour as is evident for example from the representation according to FIG. 2.

The reinforcing profile 12 includes a front profile portion 22 which regarding the travelling direction 13 of the motor vehicle 1 is located at the front, which extends approximately in a straight line and vertically at a predetermined angle, typically smaller than 15°, obliquely to the vehicle vertical direction (z) from a lower edge 8c of the wheel house 8 towards the top up to an apex portion 10 of the wheel house 8.

In or bordering on the apex portion 11, the front profile portion 20 of the reinforcing profile 12 merges into a middle profile portion 24 of the reinforcing profile 12 extending approximately horizontally.

In the region of that middle profile portion 24, a shock absorber connection 25 which in vehicle transverse direction (y) projects to the outside is formed or molded. The shock absorber arrangement 25 projecting approximately in vehicle transverse direction (y) to the outside is designed for receiving or fastening an end portion 17 facing away from the rear wheel 7 of a shock absorber 16 which for example is concretely shown in FIG. 7. The front profile portion 22, in particular its lower spring plate connecting piece 20 which comes to lie at the height of the lower edge 8c of the wheel house 8 is provided for receiving or for fastening a spring plate 14 shown in FIG. 4. A spring 18 of an axle radius arm 35 shown for example in FIG. 7 is subjected via the reinforcing profile 12 and via the spring plate 14 arranged thereon to direct support on the body side. In FIG. 7, a torsion tube 36 of the suspension of the rear axle 3 is additionally shown. Since the front profile portion 22 and the middle profile portion 24 are designed unitarily or configured in one piece, a spring connection on the body side as well as a shock absorber connection on the body side can be provided by means of a single profile portion 12 with only a single reinforcing profile 12.

The middle profile section 24 of the reinforcing profile 12 serving for the shock absorber connection or including a shock absorber connection 25 merges sweeping arc-like into a rear profile portion 26 which, as shown in FIGS. 3 to 7, approximately follows the sweeping contour of the outside 8a of the wheel house 8. Through the sweeping or arc-like contour of the rear profile portion 26, the forces which are introduced into the reinforcing profile 12 via the shock absorber connection 25 and the spring connection can be discharged comparatively harmonically and in a controlled manner into a rear end reinforcing structure 62 bordering on the reinforcing profile 12.

In the embodiment shown in FIGS. 2 to 9, the rear end reinforcing structure 62 includes in particular two reinforcing plates 30, 32 which are oriented parallel to one another and are spaced in vehicle vertical direction (z) from one another. These extend each on an inside 8b of the wheel house 8. Furthermore, as is evident from viewing the FIGS. 5 and 6 together, they come to lie on an outside 41 of a lower shell 40 of the side member 4. Furthermore, those reinforcing plates 30, 32 support themselves on a side wall 5 of the motor vehicle body 2 also in vehicle transverse direction for example with a flange 31, 33 indicated in FIG. 4 which is circumferential at least in regions. Towards the back, the reinforcing plates 30, 32 border a rear wall 44 which in particular can be structurally connected furthermore with a rear end reinforcing structure 62 configured as a torsion ring.

Figure 3:
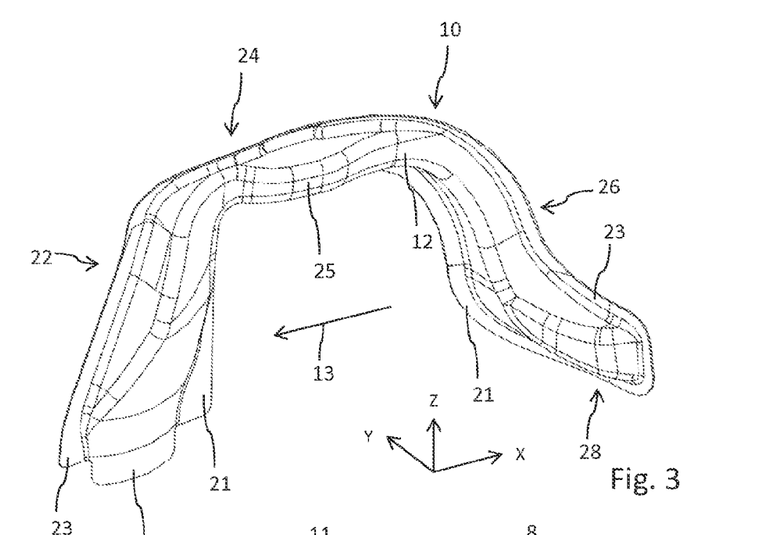
FIG. 3 is a perspective representation of the reinforcing profile to be arranged within the wheel house of the motor vehicle.

As is evident from the perspective representation of FIGS. 3, 4 and 7, the rear profile portion 26 of the reinforcing profile 12 furthermore includes a curved section 28 projecting towards the outside, in vehicle transverse direction (y), which projects almost as far as to the outer flange 9 of the wheel house 8. As is shown in the cross section of FIG. 9, the curved section 28 of the rear profile portion 26 comes to lie with an upper or outer and with a lower or inner flange 23, 21 at least partially overlapping with a flange 31 of the upper reinforcing plate 30.

Figure 9:
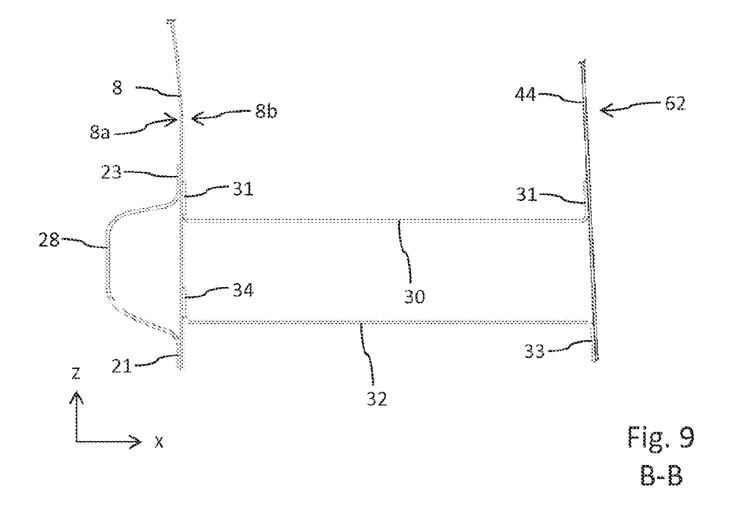
FIG. 9 is a cross section along B-B according to FIG. 7.
Figure 10:
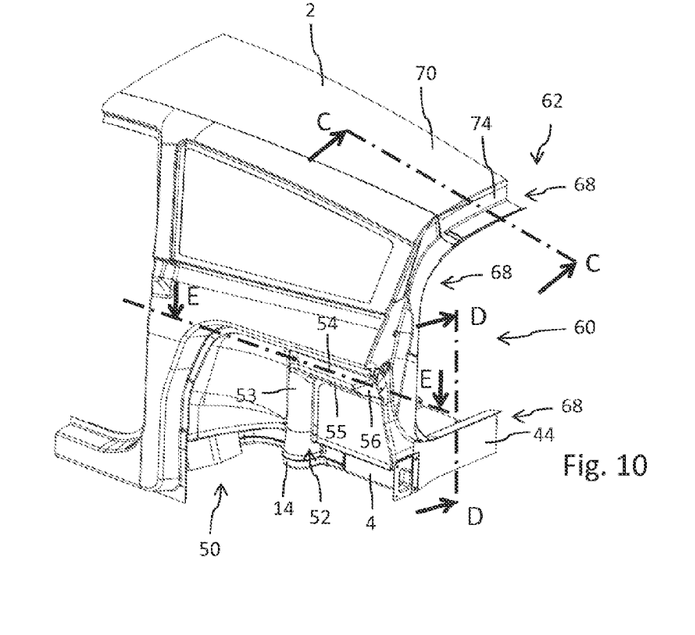
FIG. 10 is an alternative perspective configuration of a motor vehicle body in the region of a rear left wheel house.
Figure 11:
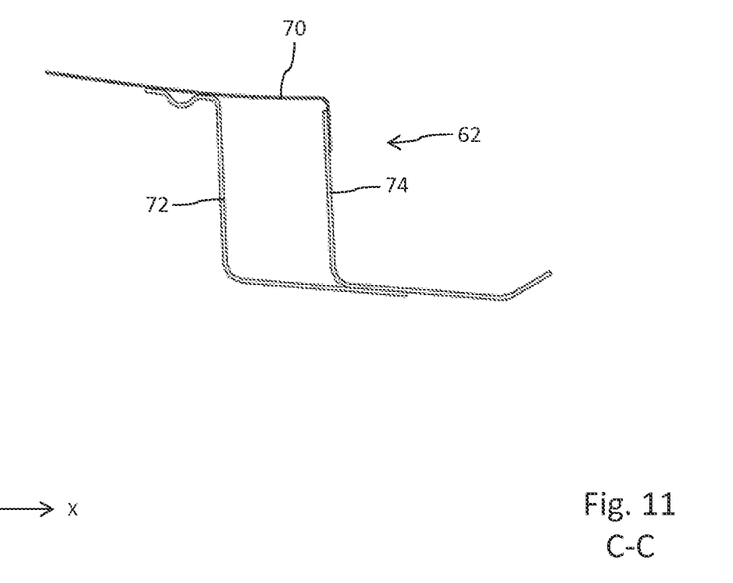
FIG. 11 is a cross section along C-C according to FIG. 10.

The flange 31 of the upper reinforcing plate 30 and the upper flange 23 of the curved section 28 in this case come to lie viewed in vehicle vertical direction (z) and vehicle transverse direction (y) at least partially overlapping with respect to one another. The wheel house 8 extends across an area between those part-overlapping flanges 23, 31. The lower reinforcing plate 32 facing the inside 8b of the wheel house 8 includes a flange 34 projecting towards the top, with which the lower reinforcing plate 32 is connected to the wheel house 8. Located opposite, facing the rear end rear wall 44, the lower reinforcing plate 32 includes a flange 33 projecting downwards, which is structurally connected to the inside of the rear wall 44.

Figure 8:
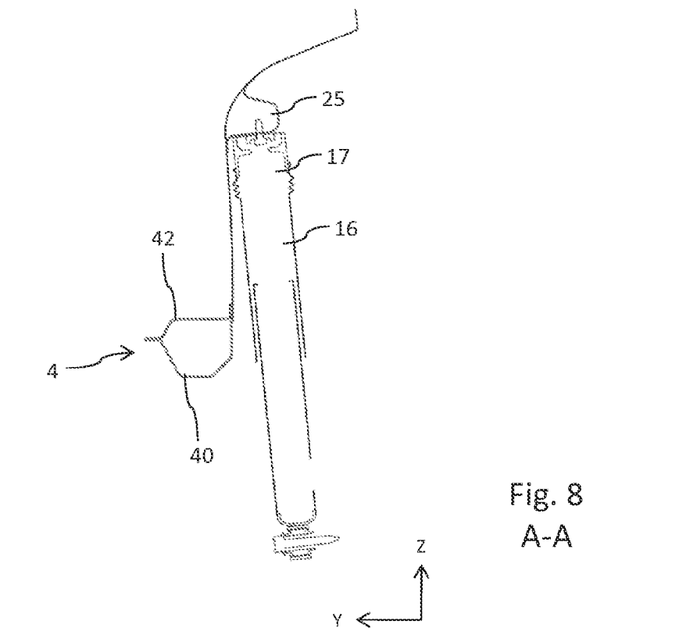
FIG. 8 is a cross section along A-A according to FIG. 7.

Shown in the cross section of FIG. 8, furthermore, is the arrangement of the shock absorber 16 to the shock absorber connection 25 of the middle profile portion 24. Furthermore, the cross section of FIG. 8 shows the profile of the side member 4 formed by lower shell 40 and upper shell 42.

Figure 6:
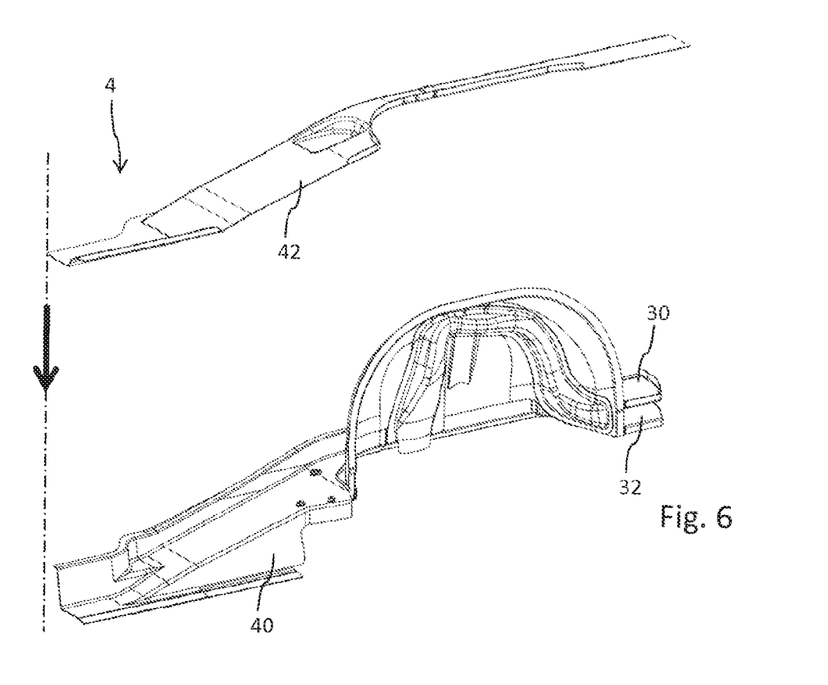
FIG. 6 is a perspective representation of the joining of the lower shell already connected to the wheel house and the reinforcing profile with an upper shell of the side member.

Furthermore, from the sequence of FIGS. 3 to 7 a joining sequence for the motor vehicle body is evident. In a first step, the reinforcing profile 12 configured as a formed sheet metal part or pressed sheet metal part is connected to the outside 8a of the wheel house 8. Furthermore, the two or at least one reinforcing plate 30, 32 can already be arranged and accordingly connected to the wheel house 8 on the inside 8b of the wheel house 8. Following this, the sub-assembly formed by the wheel house 8 and the reinforcing profile 12 can be connected to the lower shell 40 of the side member 4 before the upper shell 42, as shown in FIG. 6, is connected with the assembly so pre-configured.

In a further assembly step, for example during the wedding of the motor vehicle final assembly, the chassis components, namely the axle radius arm 35 are connected to the spring 18 and the shock absorber 16 to the motor vehicle body 2 or the reinforcing profile 12.

A further configuration of a reinforcing structure 50 is shown in the FIGS. 10 to 13. With this reinforcing structure 50, the wheel house 8 opens towards the back, facing away from the travelling direction 13, into a rear end reinforcing structure 62, which is configured as a profile ring 68 enclosing a rear aperture 60 of the motor vehicle. The reinforcing profile 52 in contrast with the configuration of FIGS. 2 to 9 has a substantially L-shaped angled contour with a front profile portion 53 substantially extending in vehicle vertical direction (z) and a middle profile portion 54 bordering on thereon, approximately extending horizontally towards the back in the apex portion 11 of the wheel house 8. The middle profile portion 54 is also provided with a shock absorber connection 55 here. The middle profile portion 54, as is evident from the cross section according to FIG. 13, unitarily merges into a rear profile portion 56, which includes a flange 58 projecting to the inside in vehicle transverse direction (y).

With that flange 58, the reinforcing profile 52 is structurally connected directly to the rear end reinforcing structure, for example to a back side 63 of the rear end reinforcing structure 62. In that lateral region of the motor vehicle body, the rear end reinforcing structure 62 is part of a circumferential profile ring 68 or torsion ring which is merely hinted in FIG. 10. In a lateral region shown in cross section in FIG. 13, in which the reinforcing profile 52 is connected to the rear end reinforcing structure 62, the rear end reinforcing structure 62 has a front reinforcing profile 80 which is designed approximately L-shaped or Z-shaped and a rear reinforcing profile 82 that is spaced there from and configured complementarily Z- or L-shaped. The two reinforcing profiles 80, 82 form a closed hollow profile structure and border in vehicle transverse direction (y) the inside 8b of the wheel house 8.

Figure 13:
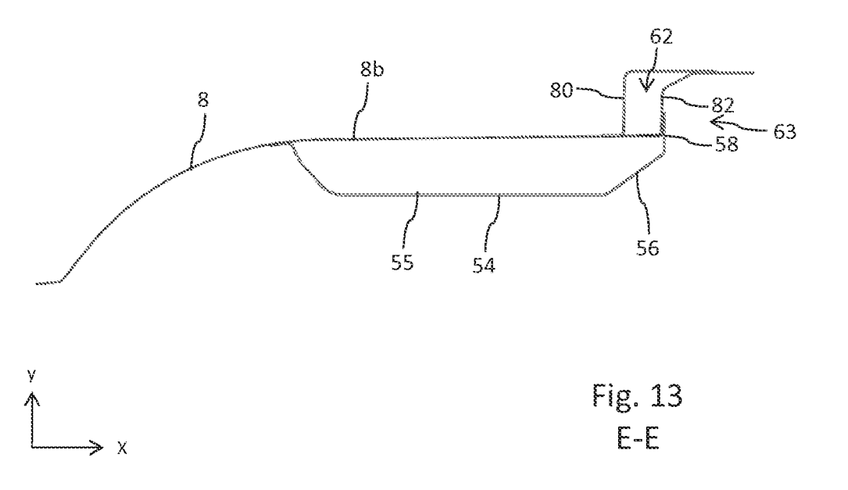
FIG. 13 is a cross section along E-E according to FIG. 10.

The rear end reinforcing structure 62, bordering on the vehicle roof 70, includes a front roof frame profile 72 and a rear roof frame profile 74. Both roof frame profiles again are designed Z- or L-shaped and subject to forming a closed hollow profile are connected to one another or to a vehicle roof 70.

Figure 12:
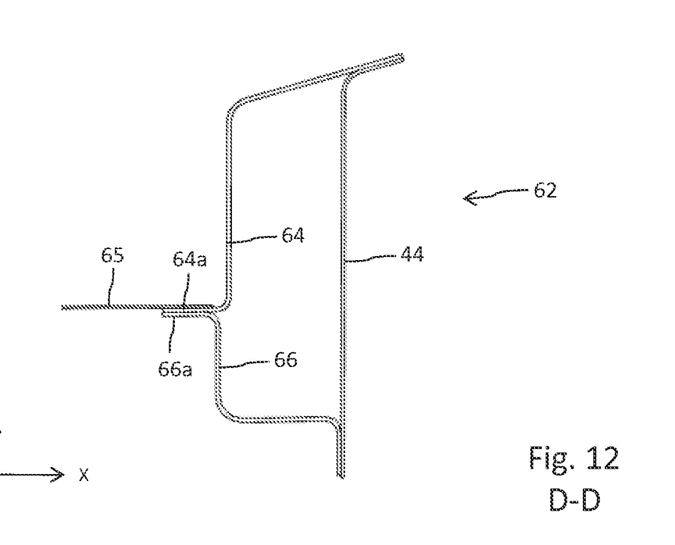
FIG. 12 is a cross section along D-D according to FIG. 10.

The cross section according to FIG. 12 shows the design of the rear end reinforcing structure 62 in the floor region of the vehicle rear. There, a rear wall 44 which is substantially configured flat is provided, which according to the representation according to FIG. 10 comes to lie approximately at the height of the rear end free end of the side member 4. Located in travelling direction 13 in front of the rear wall 44 an upper rear wall reinforcement 64 and a lower rear wall reinforcement 66 are arranged. Upper and lower rear wall reinforcement 64, 66 each have a flange 64a, 66a respectively projecting forward in travelling direction 13, via which upper and lower rear wall reinforcement 64, 66 are directly connected to one another. The flanges 64a, 66a projecting forwards simultaneously form a support and a fastening point for the floor panel 65 bordering towards the front.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A motor vehicle body comprising:
a rear wheel house; and
a reinforcing structure including a reinforcement profile located on an outside of the wheel house facing towards a rear wheel, the reinforcing structure having a spring plate connecting piece configured to fasten a spring plate extending from a lower side of the wheel house toward an upper apex portion of the wheel house and a middle profile portion which comes to lie in the region of the apex portion, the middle profile portion including a shock absorber connection configured to be fastened with a shock absorber with an end portion facing away from the rear wheel,
wherein at least a portion of the reinforcing profile comprises a C- or U-profile like cross section and is connected to the outside of the wheel house with at least one lateral flange projecting towards an outside of the vehicle.

2. The motor vehicle body according to claim 1, wherein the reinforcing profile extends from the apex portion in vehicle longitudinal direction towards the back and is structurally connected to a rear end reinforcing structure with a rear profile portion.

3. The motor vehicle body according to claim 2, wherein the rear end reinforcing structure comprises at least one reinforcing plate which extends on an inside of the wheel house in vehicle longitudinal direction facing away from the rear profile portion of the reinforcing profile, and which supports itself in vehicle transverse direction on an outside of a rear end side member.

4. The motor vehicle body according to claim 3 comprising two reinforcing plates which in vehicle vertical direction are spaced from one another, which in vehicle longitudinal direction extend between a rear end rear wall plate and the wheel house and which in vehicle transverse direction extend between the side member and a side wall.

5. The motor vehicle body according to claim 3, wherein at least one flange of the reinforcing profile contacting the outside of the wheel house is arranged in vehicle vertical direction and in vehicle transverse direction at least in regions overlapping with a flange of the at least one reinforcing plate.

6. The motor vehicle body according to claim 1, wherein the reinforcing profile includes a front profile portion which substantially extends in vehicle vertical direction from the spring plate to the apex portion of the wheel house and is located at the front based on the travelling direction of the motor vehicle.

7. The motor vehicle body according to claim 1, wherein the middle profile portion of the reinforcing profile which comes to lie in the region of the apex portion of the wheel house substantially extends in vehicle longitudinal direction.

8. The motor vehicle body according to claim 7, wherein the shock absorber connection is formed on the middle profile portion projecting in vehicle transverse direction towards the outside.

9. The motor vehicle body according to claim 1, wherein the reinforcing profile located at the back based on the travelling direction of the motor vehicle comprises a rear profile portion, which substantially extends in vehicle vertical direction from the apex portion of the wheel house to a rear lower edge of the wheel house.

10. The motor vehicle body according to claim 9, wherein the rear profile portion comprises an curved section on its lower end projecting in vehicle transverse direction towards the outside, which supports itself in vehicle longitudinal direction on the outside of the wheel house.

11. A motor vehicle body comprising:
a rear wheel house;
a reinforcing structure including a reinforcing profile located on an outside of the wheel house facing towards a rear wheel, the reinforcing structure having a spring plate connecting piece configured to fasten a spring plate extending from a lower side of the wheel house toward an upper apex portion of the wheel house and a middle profile portion which comes to lie in the region of the apex portion, the middle profile including a shock absorber connection configured to be fastened with a shock absorber with an end portion facing away from the rear wheel, the reinforcing profile extending from the apex portion in vehicle longitudinal direction towards the back and is structurally connected to a rear end reinforcing structure with a rear profile portion,
wherein the rear end reinforcing structure comprises a profile ring enclosing a rear aperture of the motor vehicle.

12. The motor vehicle body according to claim 11, wherein the rear profile portion comprises a flange which in vehicle transverse direction projects towards the inside, and which is connected to the rear end reinforcing structure with a back side facing away from the travelling direction.

13. A motor vehicle with a motor vehicle body, the motor vehicle body comprising:
a rear wheel house;
a reinforcing structure including a reinforcing profile located on an outside of the wheel house facing towards a rear wheel, the reinforcing structure having a spring plate connecting piece configured to fasten a spring plate extending from a lower side of the wheel house toward an upper apex portion of the wheel house and a middle profile portion which comes to lie in the region of the apex portion, the middle profile portion including a shock absorber connection configured to be fastened with a shock absorber with an end portion facing away from the rear wheel, and the reinforcing profile located at the back based on the travelling direction of the motor vehicle comprises a rear profile portion, which substantially extends in vehicle vertical direction from the apex portion of the wheel house to a rear lower edge of the wheel house, wherein the rear profile portion comprises an curved section on its lower end projecting in vehicle transverse direction towards the outside, which supports itself in vehicle longitudinal direction on the outside of the wheel house.

14. The motor vehicle according to claim 13, wherein the reinforcing structure has a profile which at least is C- or U-shaped bent or L-shaped angled portions in a plane formed by vehicle longitudinal direction and vehicle vertical direction and follows the contour of the wheel house.

* * * * *